(12) United States Patent
Anderson et al.

(10) Patent No.: US 9,409,502 B2
(45) Date of Patent: Aug. 9, 2016

(54) VERTICALLY ADJUSTABLE ARMREST ASSEMBLY FOR A VEHICLE INTERIOR COMPONENT

(71) Applicant: Johnson Controls Technology Company, Holland, MI (US)

(72) Inventors: Rick A. Anderson, Grand Haven, MI (US); Kenneth Daniel Sherburn, Grandville, MI (US); Randy William Nurenberg, Hudsonville, MI (US)

( * ) Notice: Subject to any disclaimer, the term of this patent is extended or adjusted under 35 U.S.C. 154(b) by 0 days.

(21) Appl. No.: 14/429,122

(22) PCT Filed: Sep. 19, 2013

(86) PCT No.: PCT/US2013/060623
§ 371 (c)(1),
(2) Date: Mar. 18, 2015

(87) PCT Pub. No.: WO2014/047290
PCT Pub. Date: Mar. 27, 2014

(65) Prior Publication Data
US 2015/0239375 A1    Aug. 27, 2015

Related U.S. Application Data

(60) Provisional application No. 61/703,886, filed on Sep. 21, 2012.

(51) Int. Cl.
| | |
|---|---|
| *B60R 11/06* | (2006.01) |
| *B60N 2/46* | (2006.01) |
| *B60R 7/04* | (2006.01) |

(52) U.S. Cl.
CPC .............. *B60N 2/464* (2013.01); *B60N 2/4633* (2013.01); *B60N 2/4686* (2013.01); *B60R 7/04* (2013.01)

(58) Field of Classification Search
CPC ........ B60R 7/04; B60N 2/4606; B60N 2/466; B60N 2/4686; A47C 1/03; A47C 1/03255; A47C 1/03266; A47C 1/03277; A47C 7/282
USPC ............... 296/37.8, 1.09, 146.7, 153, 187.05, 296/24.34; 297/411.32, 411.35, 411.36, 297/411.38
See application file for complete search history.

(56) References Cited

U.S. PATENT DOCUMENTS

| | | | | |
|---|---|---|---|---|
| 3,116,093 | A | * 12/1963 | Bosack | ................... A61G 15/10 297/115 |
| 4,848,627 | A | * 7/1989 | Maeda | ...................... B60R 7/04 108/44 |

(Continued)

FOREIGN PATENT DOCUMENTS

| | | |
|---|---|---|
| DE | 102007024000 | 11/2008 |
| FR | 2961763 | 12/2011 |

OTHER PUBLICATIONS

PCT International Search Report mailed Nov. 28, 2013.

*Primary Examiner* — Kiran B Patel

(57) ABSTRACT

An armrest assembly includes a pivot joint positioned at a first longitudinal end of the armrest assembly. The pivot joint is configured to rotatably couple the armrest assembly to a housing of a vehicle interior component. The armrest assembly also includes an armrest configured to rotate about the pivot joint between a lowered position and a raised position. In addition, the armrest assembly includes an adjustment mechanism positioned at a second longitudinal end of the armrest assembly, opposite the first longitudinal end. The adjustment mechanism is configured to hold the armrest in one of a variety of vertical positions including the lowered position and the raised position.

5 Claims, 6 Drawing Sheets

(56) References Cited

U.S. PATENT DOCUMENTS

| | | | | |
|---|---|---|---|---|
| 4,978,171 A * | 12/1990 | Tateyama | B60N 2/4633 | 297/366 |
| 4,998,770 A * | 3/1991 | Shimizu | B60N 2/4673 | 224/542 |
| 5,007,610 A * | 4/1991 | Christiansen | B60N 2/4686 | 224/275 |
| 5,072,989 A * | 12/1991 | Spykerman | A47C 7/62 | 296/37.8 |
| 5,096,152 A * | 3/1992 | Christiansen | B60N 2/4606 | 224/275 |
| 5,104,185 A * | 4/1992 | Christiansen | B60N 2/4606 | 248/311.2 |
| 5,104,186 A * | 4/1992 | Kwasnik | B60N 2/4606 | 248/311.2 |
| 5,104,187 A * | 4/1992 | Fischer | B60N 2/4606 | 248/311.2 |
| 5,116,099 A * | 5/1992 | Kwasnik | A47C 7/543 | 16/360 |
| 5,121,963 A * | 6/1992 | Kwasnik | B60N 2/4686 | 160/380 |
| 5,131,716 A * | 7/1992 | Kwasnik | B60N 3/106 | 248/311.2 |
| 5,316,368 A * | 5/1994 | Arbisi | B60N 3/102 | 224/275 |
| 5,558,404 A * | 9/1996 | Muzzy | B60N 2/4626 | 297/411.38 |
| 5,562,331 A * | 10/1996 | Spykerman | B60N 2/4686 | 297/188.16 |
| 5,769,496 A * | 6/1998 | Gryp | A47C 1/03 | 297/411.32 |
| 5,810,434 A * | 9/1998 | Thompson | B60N 2/4606 | 297/188.19 |
| 5,823,624 A * | 10/1998 | Dahlbacka | B60N 2/464 | 297/411.32 |
| 5,984,416 A * | 11/1999 | Waldo | A47C 1/03 | 297/411.32 |
| 6,032,587 A * | 3/2000 | Salenbauch | B60N 2/4686 | 108/44 |
| 6,033,015 A * | 3/2000 | Husted | B60N 2/4686 | 16/307 |
| 6,045,173 A * | 4/2000 | Tiesler | B60N 2/4646 | 220/813 |
| 6,382,726 B2 * | 5/2002 | Bullesbach | 297/411.32 | |
| 6,419,314 B1 * | 7/2002 | Scheerhorn | B60N 2/4646 | 296/37.8 |
| 6,652,032 B2 * | 11/2003 | Laval | B60N 2/4686 | 297/411.32 |
| 6,719,343 B2 * | 4/2004 | Emerling | B60N 2/4686 | 224/539 |
| 6,736,438 B1 * | 5/2004 | Wieclawski | B60N 2/4673 | 224/275 |
| 7,114,755 B1 * | 10/2006 | Sturt | B60N 3/102 | 296/24.34 |
| 7,114,772 B2 * | 10/2006 | Kobayashi | B60N 3/103 | 297/188.04 |
| 7,147,259 B2 * | 12/2006 | Radu | B60N 2/46 | 224/275 |
| 7,185,952 B1 * | 3/2007 | Chen | B60N 2/4633 | 297/411.38 |
| 7,192,070 B2 * | 3/2007 | Radu | B60N 2/4606 | 296/1.09 |
| 7,748,762 B2 * | 7/2010 | Mayne, Jr. | B60N 2/4686 | 224/275 |
| 7,845,732 B2 * | 12/2010 | Liu | B60N 2/4633 | 297/411.32 |
| 7,967,386 B2 * | 6/2011 | Na | B60N 2/206 | 297/125 |
| 8,235,442 B2 * | 8/2012 | Spitler | B60R 7/04 | 296/24.34 |
| 8,403,416 B2 * | 3/2013 | Muck | B60N 2/4606 | 297/411.32 |
| 8,528,956 B1 * | 9/2013 | Winiger | B60R 7/04 | 296/24.34 |
| 8,943,650 B2 * | 2/2015 | Anderson | B60N 2/4686 | 16/330 |
| 8,944,512 B2 * | 2/2015 | Girbinger | B60N 2/4633 | 297/411.32 |
| 8,961,062 B2 * | 2/2015 | Gillis | B60N 2/46 | 292/163 |
| 9,227,538 B2 * | 1/2016 | Girbinger | B60N 2/4606 | |
| 9,278,638 B2 * | 3/2016 | Tsuchida | B60N 3/002 | |
| 9,290,117 B2 * | 3/2016 | Goodhall | B60N 2/4613 | |
| 2009/0284034 A1 * | 11/2009 | Nuss | B60N 2/4606 | 296/1.07 |

* cited by examiner

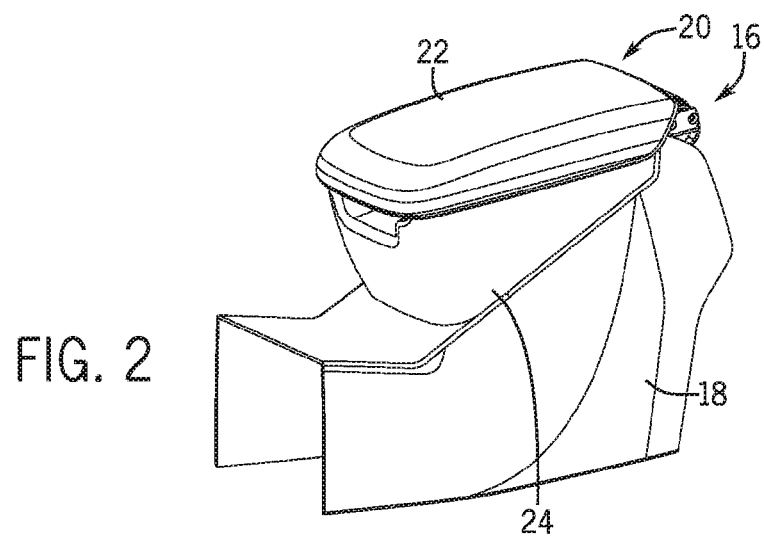
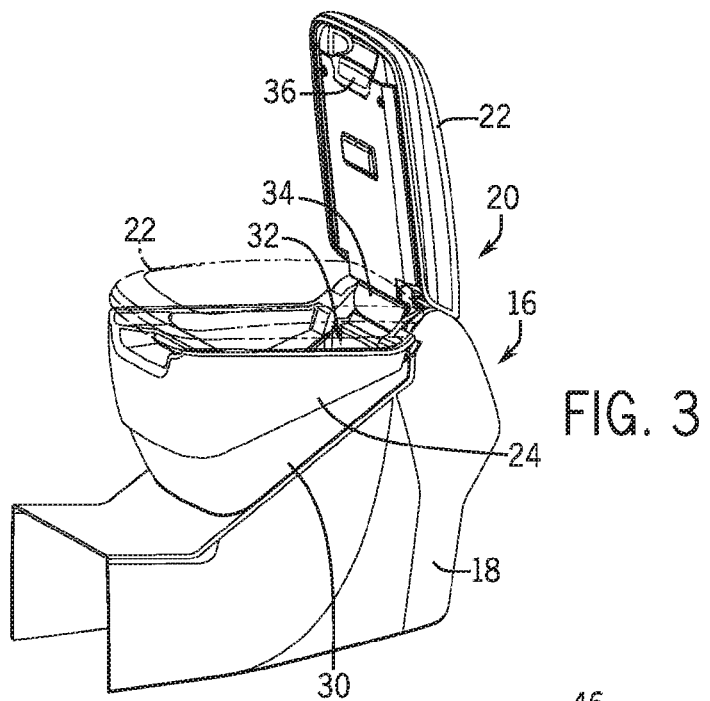
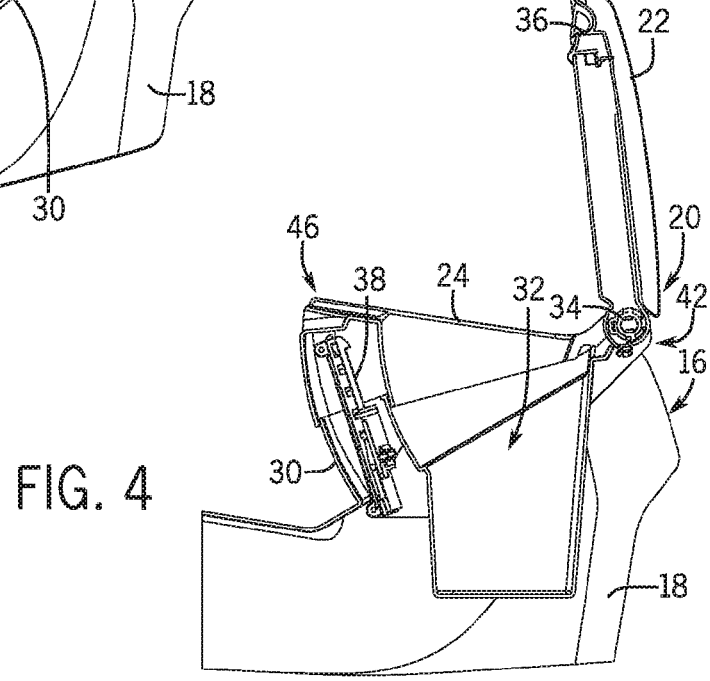

VERTICALLY ADJUSTABLE ARMREST ASSEMBLY FOR A VEHICLE INTERIOR COMPONENT

CROSS REFERENCE TO RELATED APPLICATION

This application is a national stage of PCT Application No. PCT/US2013/60623 entitled "VERTICALLY ADJUSTABLE ARMREST ASSEMBLY FOR A VEHICLE INTERIOR COMPONENT" filed on Sep. 19, 2013, which claims priority from and the benefit of U.S. Provisional Application Ser. No. 61/703,886, entitled "VERTICALLY ADJUSTABLE ARMREST ASSEMBLY FOR A VEHICLE INTERIOR COMPONENT" filed Sep. 21, 2012. Each of the foregoing applications is hereby incorporated by reference in its entirety.

BACKGROUND

The invention relates generally to a vertically adjustable armrest assembly for a vehicle interior component.

Certain vehicles include an armrest to facilitate passenger comfort. The armrest may be coupled to a vehicle seat, a door panel, and/or a floor console. In certain configurations, the vertical position of the armrest is adjustable to accommodate vehicle occupants of different heights and/or builds. For example, the armrest may be configured to rotate about a pivot joint between a lowered position and a raised position. An adjustment mechanism may be employed to hold the armrest in a desired position (e.g., between the lowered position and the raised position). Certain adjustment mechanisms are integrated within the pivot joint and/or coupled to the pivot joint to selectively block rotation of the armrest when a desired armrest position is achieved. Unfortunately, such adjustment mechanisms may be subjected to a large torque as the vehicle occupant applies weight to the armrest. Accordingly, the adjustment mechanisms may be constructed from heavy and/or expensive materials (e.g., steel) to resist the torque, thereby increasing the weight and/or manufacturing cost of the vehicle.

In certain configurations, the vertically adjustable armrest may be positioned over a storage compartment. The armrest is configured to block an opening in the storage compartment while in the lowered position, thereby retaining items (e.g., portable electronic devices, glasses, documentation, etc.) within the storage compartment. Unfortunately, when the armrest is rotated to the raised position, the opening may be uncovered, thereby enabling items to be released from the storage compartment during vehicle operation.

BRIEF DESCRIPTION OF THE INVENTION

The present invention relates to an armrest assembly including a pivot joint positioned at a first longitudinal end of the armrest assembly. The pivot joint is configured to rotatably couple the armrest assembly to a housing of a vehicle interior component. The armrest assembly also includes an armrest configured to rotate about the pivot joint between a lowered position and a raised position. The armrest assembly further includes a shroud positioned below the armrest and configured to rotate with the armrest about the pivot joint. The shroud and the armrest are configured to substantially cover an opening in a storage compartment of the housing while the armrest is in the lowered position, the raised position, or a position therebetween. In addition, the armrest assembly includes an adjustment mechanism positioned at a second longitudinal end of the armrest assembly, opposite the first longitudinal end. The adjustment mechanism is configured to hold the armrest in one of a variety of vertical positions including the lowered position and the raised position.

The present invention also relates to an armrest assembly including a pivot joint positioned at a first longitudinal end of the armrest assembly. The pivot joint is configured to rotatably couple the armrest assembly to a housing of a vehicle interior component. The armrest assembly also includes an armrest configured to rotate about the pivot joint between a lowered position and a raised position. In addition, the armrest assembly includes an adjustment mechanism positioned at a second longitudinal end of the armrest assembly, opposite the first longitudinal end. The adjustment mechanism is configured to hold the armrest in one of a variety of vertical positions including the lowered position and the raised position.

The present invention further relates to an armrest assembly including a pivot joint configured to rotatably couple the armrest assembly to a housing of a vehicle interior component. The armrest assembly also includes an armrest configured to rotate about the pivot joint between a lowered position and a raised position. In addition, the armrest assembly includes a shroud positioned below the armrest and configured to rotate with the armrest about the pivot joint. The shroud and the armrest are configured to substantially cover an opening in a storage compartment of the housing while the armrest is in the lowered position, the raised position, or a position therebetween.

DRAWINGS

FIG. 2 is a schematic perspective view of an embodiment of a floor console having a vertically adjustable armrest according to an exemplary embodiment.

FIG. 3 is a schematic perspective view of the floor console with the vertically adjustable armrest in a raised position according to an exemplary embodiment.

FIG. 4 is a schematic cross-sectional view of the floor console according to an exemplary embodiment.

DETAILED DESCRIPTION

Figure 1:
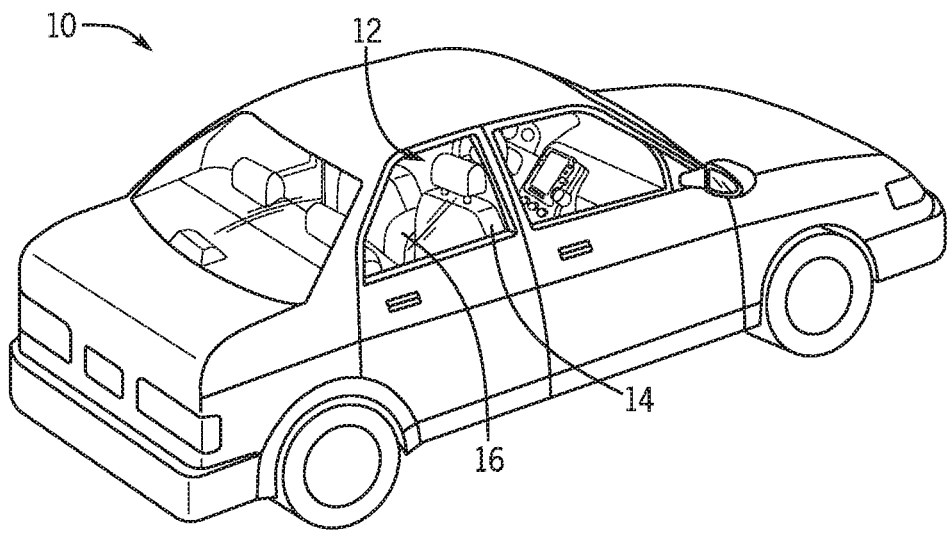
FIG. 1 is a schematic perspective view of an exemplary vehicle that may include an interior component having a vertically adjustable armrest according to an exemplary embodiment.

FIG. 1 is a perspective view of an exemplary vehicle that may include an interior component having a vertically adjustable armrest. A vehicle 10 includes an interior 12 having a seat 14 and a floor console 16. Floor console 16 may include a vertically adjustable armrest configured to be raised and/or lowered to a position that facilitates driver and/or passenger comfort. According to an exemplary embodiment, an armrest assembly includes a pivot joint positioned at a first longitudinal end of the armrest assembly. The pivot joint is configured to rotatably couple the armrest assembly to a housing of the floor console 16. The armrest assembly also includes an armrest configured to rotate about the pivot joint between a lowered position and a raised position. Floor console 16 includes a storage compartment configured to retain various items, such as portable electronic devices, documentation, and/or glasses, among other items. According to an exemplary embodiment, the armrest assembly includes a shroud positioned below the armrest and configured to rotate with the armrest about the pivot joint. The armrest and the shroud are configured to substantially cover an opening in the storage compartment while the armrest is in the lowered position, the raised position, or a position between. Items within the storage compartment are retained regardless of armrest position.

In certain embodiments, the armrest assembly includes an adjustment mechanism positioned at a second longitudinal end of the armrest assembly, opposite the first longitudinal end. For example, the pivot joint may be positioned at a rear portion of the armrest assembly, and the adjustment mechanism may be positioned at a front portion of the armrest assembly. The adjustment mechanism is configured to hold the armrest in one of a number of vertical positions including the lowered position and the raised position. Because the adjustment mechanism is positioned at the opposite longitudinal end of the armrest assembly from the pivot joint, the adjustment mechanism may be subjected to less loading (e.g., torque) than an adjustment mechanism integrated within or coupled to the pivot joint. Accordingly, the adjustment mechanism may be constructed from lighter and/or less expensive materials, thereby reducing vehicle weight and/or manufacturing costs.

While the vertically adjustable armrest assembly is described below with reference to a floor console, it should be appreciated that the vertically adjustable armrest assembly may be employed within other vehicle interior components. For example, a seat, a door panel, and/or a rear seat assembly may include a vertically adjustable armrest configured to be raised and/or lowered to a position that facilitates driver and/or passenger comfort. In certain embodiments, the armrest assembly may include a shroud configured to substantially cover an opening in the storage compartment while the armrest is in the lowered position, the raised position, or a position therebetween. The armrest assembly may also include an adjustment mechanism positioned at the opposite longitudinal end of the armrest assembly from the pivot joint to facilitate reduced structural loading on the adjustment mechanism.

FIG. 2 is a perspective view of an embodiment of a floor console 16 having a vertically adjustable armrest. Floor console 16 includes a housing 18 configured to support an armrest assembly 20. Housing 18 may include a storage compartment configured to retain various items such as documents, glasses, and/or portable electronic devices, among other items. Armrest assembly 20 includes an armrest 22 configured to rotate between the illustrated lowered position, and a raised position. The armrest assembly 20 also includes a shroud 24 positioned below the armrest 22 and configured to rotate with the armrest 22. The shroud 24 and the armrest 22 are configured to substantially cover an opening in the storage compartment while the armrest is in the lowered position, the raised position, or a position between. Items within the storage compartment are retained regardless of armrest position.

The shroud 24 is disposed about a vertical extension of the housing 18. With the armrest 22 in the lowered position, the shroud 24 substantially covers the vertical extension. When the armrest is rotated in an upward direction, a portion of the vertical extension is exposed. Contact between the shroud 24 and the vertical extension blocks items from being released from the storage compartment. Items within the storage compartment are retained regardless of armrest position. The armrest 22 may also be rotated in a downward direction to the illustrated lowered position. An adjustment mechanism may be employed to control movement of the armrest relative to the floor console, and to hold the armrest in one of a variety of vertical positions.

FIG. 3 is a perspective view of the floor console with the vertically adjustable armrest 22 in a raised position. With the armrest 22 in the raised position, a portion of the vertical extension 30 of the housing 18 is exposed. Contact between the shroud 24 and the vertical extension 30 blocks items from being released from the storage compartment 32 while the armrest is in the raised position. Items within the storage compartment 32 are retained regardless of armrest position.

The armrest assembly 20 includes a pivot joint 34 positioned at a rearward longitudinal end of the armrest assembly 20. The pivot joint 34 is configured to rotatably couple the armrest assembly 20 to the housing 18 of the floor console 16. The armrest 22 is configured to rotate about the pivot joint 34 between the lowered position and the raised position. The shroud 24 is configured to rotate with the armrest 22 about the pivot joint 34. The shroud 24 and the armrest 22 are configured to substantially cover an opening in the storage compartment 32 while the armrest 22 is in the lowered position (see FIG. 2) the raised position (see FIG. 3) or a position between the lowered position and the raised position.

The armrest 22 is configured to rotate about the pivot joint 34 relative to the shroud 24 to facilitate access to the storage compartment 32. While the armrest 22 is in the closed position the armrest 22 and the shroud 24 substantially cover the opening in the storage compartment 32, blocking access to items within the storage compartment. A vehicle occupant may rotate the armrest 22 to an open position, enabling the occupant to access items within the storage compartment 32. According to an exemplary embodiment, the armrest assembly 20 includes a release mechanism 36 configured to selectively block rotation of the armrest 22 relative to the shroud 24. The armrest 22 may be held in the closed position during vehicle operation. By engaging the release mechanism 36, an occupant may rotate the armrest 22 to the open position, facilitating access to the storage compartment 32. The armrest 22 may be rotated between the open position and the closed position independently of the vertical height adjustment. A vehicle occupant may access the storage compartment while the armrest is in the raised position, the lowered position, or a position between.

FIG. 4 is a cross-sectional view of the floor console 16. The armrest assembly 20 includes an adjustment mechanism 38 configured to hold the armrest in one of a variety of vertical positions including the lowered position and the raised position. A height of the armrest 22 may be adjusted in a vertical direction to facilitate passenger comfort (e.g., to accommodate passengers of different heights and/or builds). The pivot joint 34 is positioned at a first (e.g., rear) end 42 of the armrest assembly 20 along a longitudinal direction. The adjustment mechanism 38 is positioned at a second (e.g., front) end 46 of the armrest assembly 20, opposite the first end, along the longitudinal direction. Because the adjustment mechanism 38 is positioned at the opposite longitudinal end of the armrest assembly 20 from the pivot joint 34, the adjustment mechanism 38 may be subjected to less loading (e.g., torque) than an adjustment mechanism integrated within or coupled to the pivot joint. The adjustment mechanism may be constructed from lighter and/or less expensive materials (e.g., plastic) reducing vehicle weight and/or manufacturing costs.

The shroud 24 is disposed about the vertical extension 30 of the housing 18. Contact between the shroud 24 and the vertical extension 30 blocks items from being released from the storage compartment 32. Items within the storage compartment 32 are retained regardless of armrest position. The adjustment mechanism 38 is positioned within a cavity between an exterior surface of the floor console 16 and an interior surface of the storage compartment 32. The adjustment mechanism 38 is hidden from the vehicle occupants, enhancing the appearance of the vehicle interior.

Figure 5:
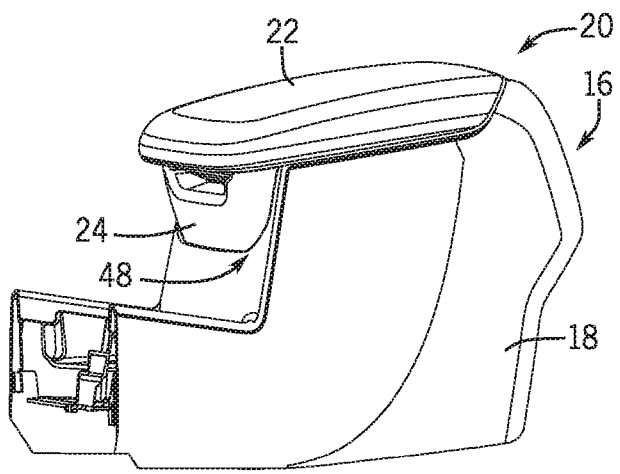
FIG. 5 is a schematic perspective view of another embodiment of a floor console having a vertically adjustable armrest according to an exemplary embodiment.

FIG. 5 is a perspective view of floor console 16 having a vertically adjustable armrest according to an exemplary embodiment. The shroud 24 is disposed within a recess 48 in the housing 18. With the armrest 22 in the lowered position, the housing 18 substantially covers the shroud 24. When the armrest 22 is rotated in an upward direction, an additional portion of the shroud 24 is exposed. The shroud 24 and the armrest 22 are configured to substantially cover an opening in the storage compartment while the armrest is in the lowered position, the raised position, or a position between. Items within the storage compartment are retained regardless of armrest position.

Figure 6:
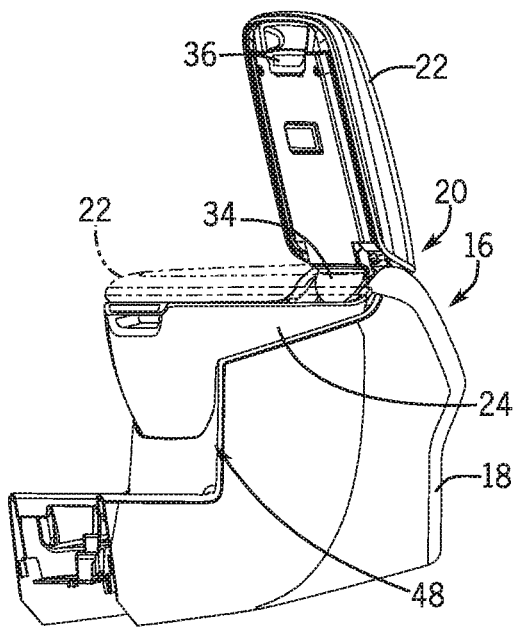
FIG. 6 is a schematic perspective view of the floor console with the vertically adjustable armrest in a raised position according to an exemplary embodiment.

FIG. 6 is a perspective view of the floor console 16 with the vertically adjustable armrest in a raised position. With the armrest 22 in the raised position, a larger portion of the shroud 24 is exposed. Contact between the shroud 24 and the housing 18 blocks items from being released from the storage compartment 32 while the armrest is in the raised position. Items within the storage compartment 32 are retained regardless of armrest position.

According to an exemplary embodiment, the pivot joint 34 is configured to rotatably couple the armrest assembly 20 to the housing 18 of the floor console 16. The armrest 22 is configured to rotate about the pivot joint 34 between the lowered position and the raised position. The shroud 24 is configured to rotate with the armrest 22 about the pivot joint 34. The shroud 24 and the armrest 22 are configured to substantially cover an opening in the storage compartment 32 while the armrest 22 is in the lowered position (see FIG. 5), the raised position (see FIG. 6), or a position between the lowered position and the raised position.

Figure 7:
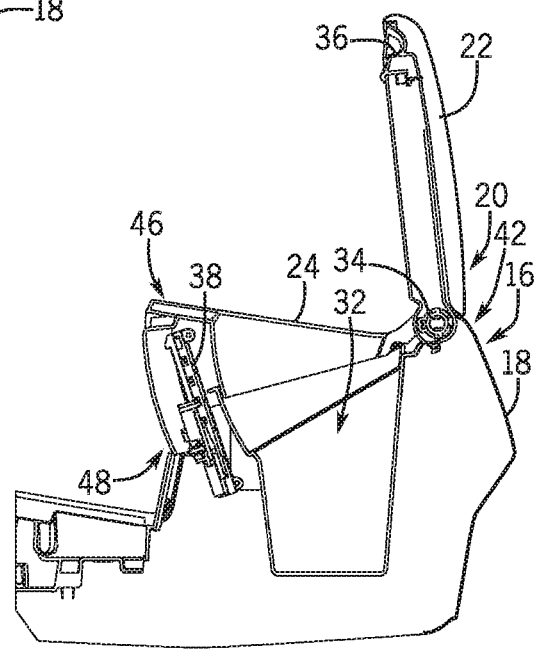
FIG. 7 is a schematic cross-sectional view of the floor console according to an exemplary embodiment.

FIG. 7 is a cross-sectional view of the floor console 16. The armrest assembly 20 includes an adjustment mechanism 38 configured to hold the armrest in one of a variety of vertical positions including the lowered position and the raised position. Height of the armrest 22 may be adjusted in the vertical direction 40 to facilitate passenger comfort (e.g., to accommodate passengers of different heights and/or builds). The shroud 24 is disposed within a recess 48 of the housing 18. Contact between the shroud 24 and the housing 18 blocks items from being released from the storage compartment 32. Items within the storage compartment 32 are retained regardless of armrest position. The adjustment mechanism 38 is positioned within a cavity between an exterior surface of the floor console 16 and an interior surface of the storage compartment 32; adjustment mechanism 38 is hidden from the vehicle occupants enhancing the appearance of the vehicle interior.

Figure 8:
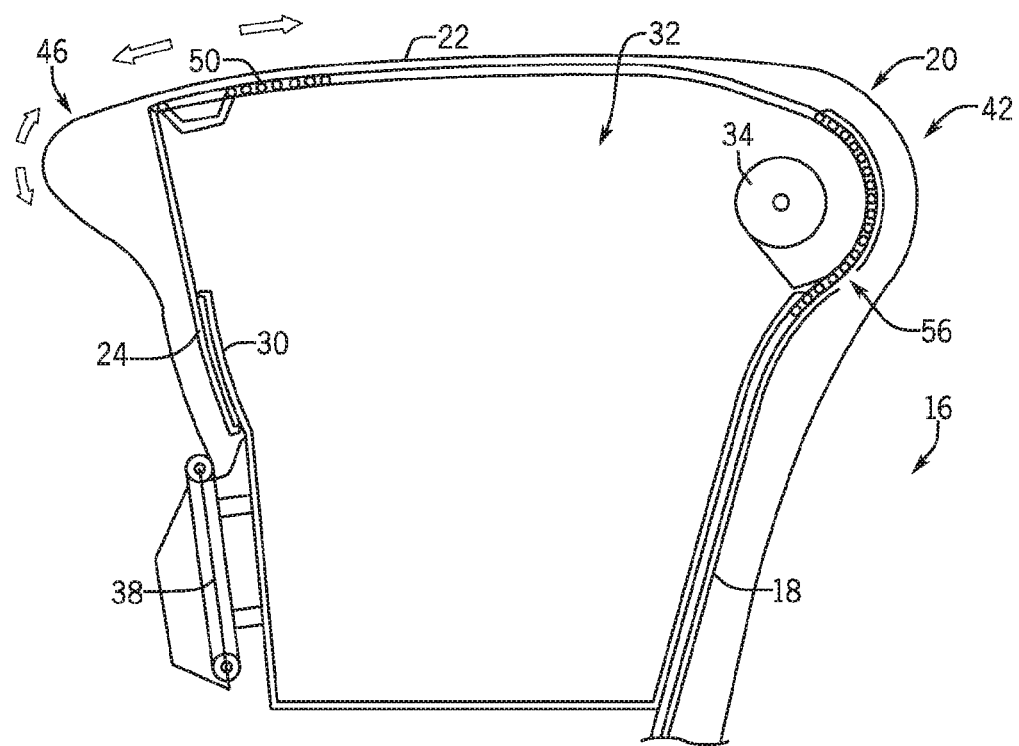
FIG. 8 is a schematic cross-sectional view of a floor console including a vertically adjustable armrest having a tambour door according to an exemplary embodiment.

FIG. 8 is a cross-sectional view of a further embodiment of a floor console 16 including a vertically adjustable armrest 22 having a tambour door 50. The tambour door 50 is configured to slide from the closed position to an open position. The closed position substantially blocks the opening to the storage compartment, and the open position facilitates access to the storage compartment 32. A vehicle occupant may slide the tambour door 50 towards the open position access items within the storage compartment 32 and then slide the tambour door 50 to close the storage compartment.

According to an exemplary embodiment, the armrest 22 is configured to rotate between a lowered position and a raised position. A shroud 24 is positioned below the armrest 22 and configured to rotate with the armrest. The shroud 24 and the armrest 22 are configured to substantially cover the opening in the storage compartment while the armrest is in the lowered position, the raised position, or a position between, and the tambour door is closed. Access to the storage compartment 32 is provided by the tambour door 50. A gap 56 is formed between the armrest 22 and the housing 18 to facilitate rotation of the armrest 22 relative to the housing 18. The tambour door 50 extends across the gap 56 substantially enclosing the storage compartment regardless of armrest position.

While an armrest configured to rotate relative to the shroud, and an armrest having a tambour door have been described above, it should be appreciated that the armrest assembly may include other armrest configurations. For example, certain armrest assemblies may include an armrest configured to slide in the longitudinal direction (e.g., fore and aft) relative to the shroud. In such a configuration, the armrest may be positioned at a desired vertical position and a desired longitudinal position, thereby enhancing passenger comfort. Similar to the embodiments described above with reference to FIGS. 2-7, the sliding armrest may rotate relative to the shroud to facilitate access to the storage compartment. However, with the sliding armrest in the closed position, access to the storage compartment may be blocked throughout the longitudinal and vertical ranges of motion of the armrest.

Figure 9:
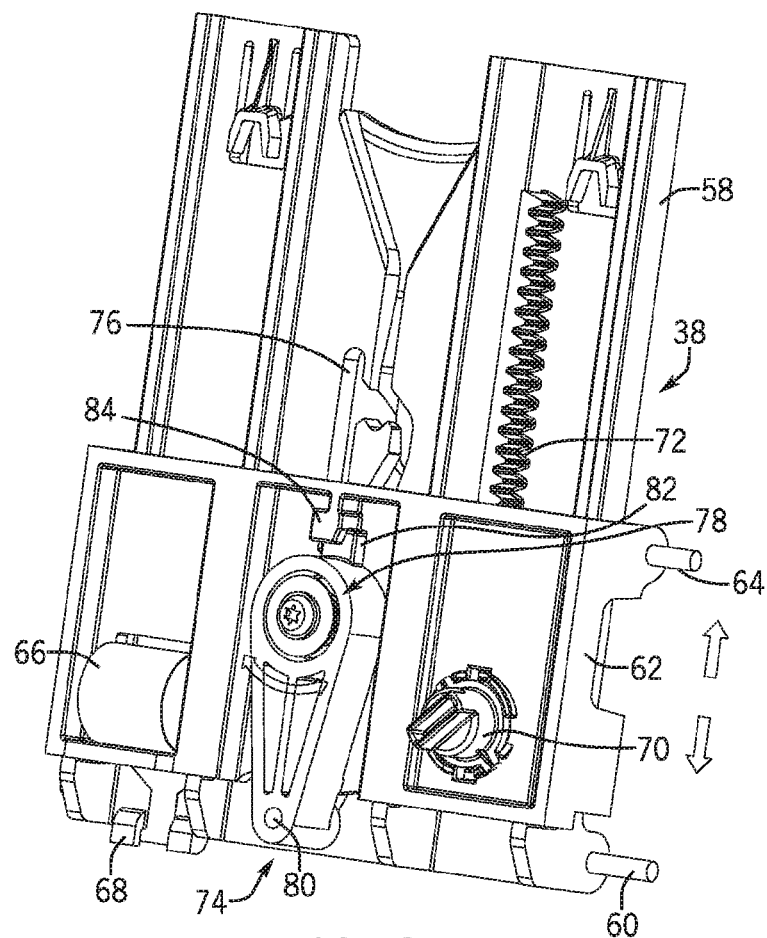
FIG. 9 is a schematic perspective view of an embodiment of an adjustment mechanism configured to hold an armrest in a desired vertical position according to an exemplary embodiment.

FIG. 9 is a perspective view of an embodiment of an adjustment mechanism 38 configured to hold an armrest in a desired vertical position. The adjustment mechanism 38 includes a guide 58 rotatably coupled to the housing 18 (shown in FIGS. 4 and 7) by a first pin 60, and a carrier 62 rotatably coupled to the armrest 22 by a second pin 64. The carrier 62 is configured to translate along the guide 58 to transition the armrest between a variety of vertical positions. The carrier 62 may be rotatably coupled to the housing 18 and the guide 58 may be rotatably coupled to the armrest 22.

In the illustrated embodiment, the adjustment mechanism 38 includes a biasing member, such as the illustrated tape spring 66, extending between the carrier 62 and a mount 68 on the guide 58. The tape spring 66 is configured to urge the armrest 22 toward the lowered position, thereby resisting upward movement of the armrest during operation of the vehicle. In addition, the adjustment mechanism 38 includes a damping member 70 extending between the carrier 62 and the guide 58. The damping member 70 is configured to damp movement of the armrest 22 relative to the housing 18. In the illustrated embodiment, the damping member 70 includes a gear configured to engage a rack 72 of the guide 58. The damping member 70 is configured to resist rotation of the gear, thereby damping movement of the carrier 62 along the guide 58.

The adjustment mechanism 38 includes a follower 74 rotatably coupled to the carrier 62, and a track 76 within the guide 58. A biasing assembly 78 is configured to urge a pin 80 of the follower 74 into the track 76 enabling the pin 80 to follow the contours of the track 76. The follower 74 includes a protrusion 82 configured to engage an extension 84 of the carrier 62. Contact between the protrusion 82 and the extension 84 blocks rotation of the upper end of the follower 74 away from the guide 58, substantially reducing or eliminating the possibility of the pin 80 disengaging the track 76. The protrusion 82 and the extension 84 facilitate rotation (e.g. to pivot) of the follower 74 enabling the pin 80 to follow the contours of the track. The track 76 includes multiple notches configured to capture the pin 80 blocking downward movement of the armrest 22 relative to the housing 18.

Figure 10:
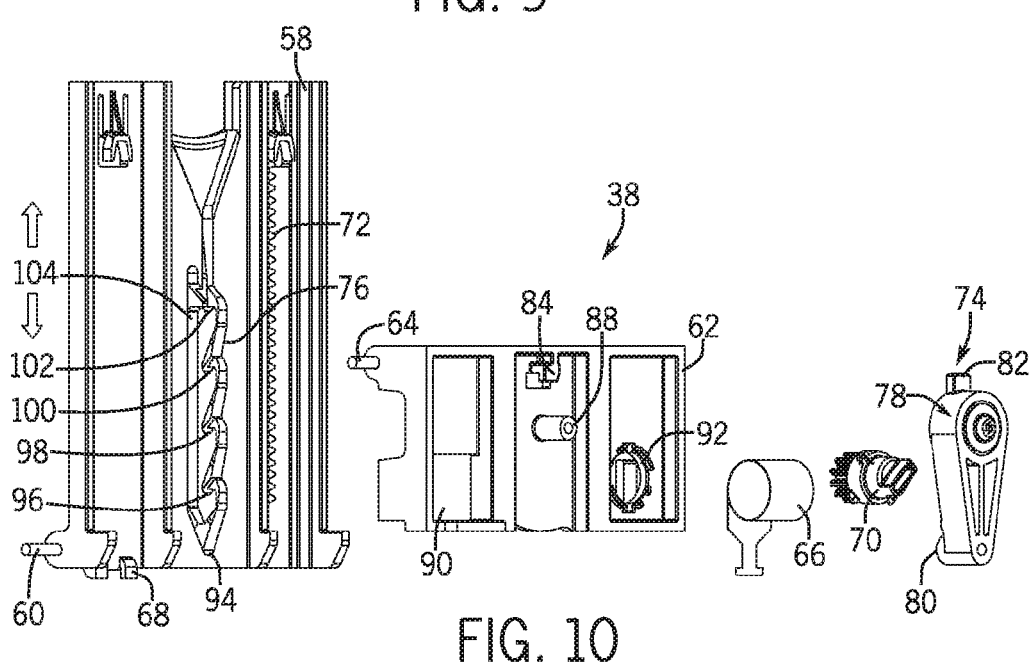
FIG. 10 is a schematic exploded view of the adjustment mechanism according to an exemplary embodiment.

FIG. 10 is an exploded view of the adjustment mechanism 38. The carrier 62 includes a cylindrical mount 88 for rotatably coupling the follower 74 to the carrier 62. A fastener within the biasing assembly 78 is configured to engage an opening in the cylindrical mount (e.g., via a threaded connection) to secure the follower 74 to the carrier 62. The carrier 62 also includes a first opening 90 configured to accommodate the tape spring 66, and a second opening 92 configured to accommodate the damping member 70.

The track 76 includes multiple notches configured to capture the pin 80 blocking downward movement of the armrest relative to the housing. The track 76 includes a first notch 94 corresponding to the lowered position of the armrest. To increase a height of the armrest, an occupant lifts the armrest in the upward direction until a desired armrest position is achieved. The occupant then releases the armrest, and a combination of the weight of the armrest and the force of the tape spring 66 drives the armrest in the downward direction until the pin 80 engages the first notch below the release point. If the occupant releases the armrest while the pin is between the first notch 94 and a second notch 96, the armrest moves downwardly until the pin 80 engages the first notch 94; if the occupant releases the armrest while the pin is between the second notch 96 and a third notch 98, the armrest moves downwardly until the pin 80 engages the second notch 96. The pin 80 may engage the third notch 98, a fourth notch 100, or a fifth notch 102 (e.g., corresponding to the raised position of the armrest) in a similar manner. To lower the armrest, the occupant lifts the armrest above the fifth notch 102 such that the pin 80 engages a straight portion 104 of the track 76. Upon release of the armrest, the combination of the armrest weight and the force of the tape spring 66 urges the armrest back to the first notch 94. As the armrest moves in the downward direction, the damping member 70 limits the speed of the armrest reducing the contact force between the pin 80 and the first notch 94, and providing smooth armrest movement.

Figure 11:
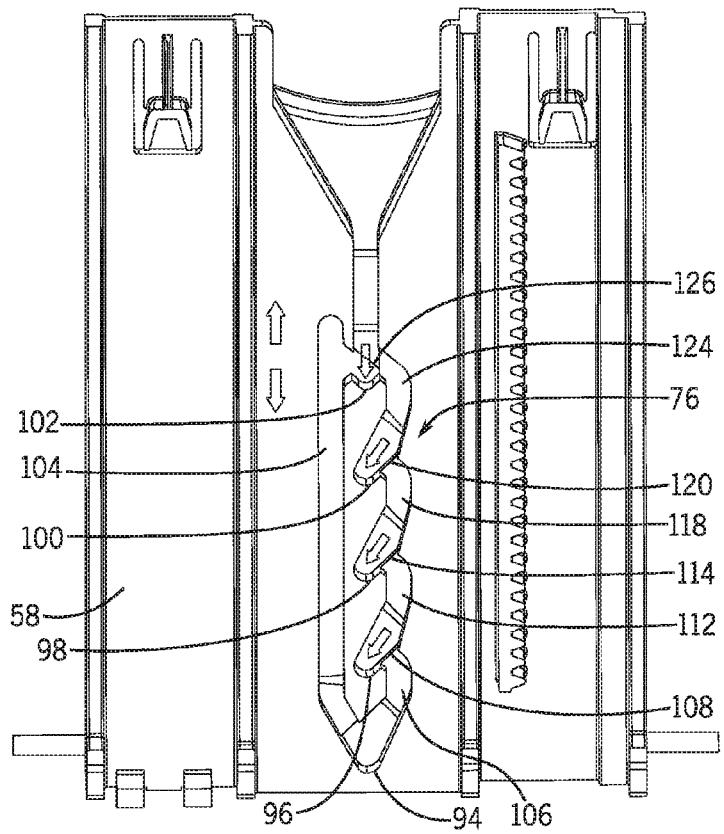
FIG. 11 is a schematic detailed front view of an embodiment of a track that may be employed within the adjustment mechanism according to an exemplary embodiment.

FIG. 11 is a detailed front view of an embodiment of a track 76 that may be employed within the adjustment mechanism 38. The track 76 includes multiple ramps and ridges configured to control movement of the pin within the track. The track 76 includes a first ramp 106 positioned above the first notch 94. As the armrest is lifted in the upward direction, the first ramp 106 drives the pin 80 outwardly (e.g., away from the guide 58) against the bias of the biasing assembly 78. At the end of the ramp 106, which corresponds to a first ridge 108, the pin 80 moves inwardly (e.g., toward the guide 58). Contact between the pin 80 and the ridge 108 blocks movement of the pin 80 toward the first notch 94. In addition, the ridge 108 directs the pin 80 toward the second notch 96. With the armrest released while the pin is between the second notch 96 and the third notch 98, the combination of the armrest weight and the force of the tape spring 66 drives the pin 80 into the second notch 96. The weight of the armrest and the force applied by the tape spring 66 also urge the pin 80 into the notch 96 during operation of the vehicle, substantially reducing undesired movement of the armrest.

To raise the armrest 22 to the next higher vertical position, the occupant lifts the armrest in the upward direction. A second ramp 112 drives the pin 80 outwardly (e.g., away from the guide 58) against the bias of the biasing assembly 78. At the end of the ramp 112, which corresponds to a second ridge 114, the pin 80 moves inwardly (e.g., toward the guide 58). Contact between the pin 80 and the ridge 114 blocks movement of the pin 80 toward the second notch 96. The ridge 114 directs the pin 80 toward the third notch 98. If the armrest is released between the third notch 98 and the fourth notch 100, the combination of the armrest weight and the force of the tape spring 66 drives the pin 80 into the third notch 98. The track 76 also includes a third ramp 118 extending to a third ridge 120, which is configured to direct the pin 80 toward the fourth notch 100. The track 76 includes a fourth ramp 124 extending to a fourth ridge 126, which is configured to direct the pin 80 toward the fifth notch 102.

The forth ridge 126 is also configured to direct the pin 80 toward the straight portion 104 of the track 76 upon upward movement of the armrest 22 beyond the fifth notch 102. To transition the armrest to the lowered position, the occupant lifts the armrest to the maximum vertical position, and then releases the armrest. The weight of the armrest and the force applied by the tape spring 66 drive the pin in the downward direction to the first notch 94, returning the armrest to the lowered position. While the embodiment includes five notches (which correspond to five vertical armrest positions) alternative embodiments may include more or fewer notches/vertical armrest positions (providing a corresponding number of vertical armrest positions).

Figure 12:
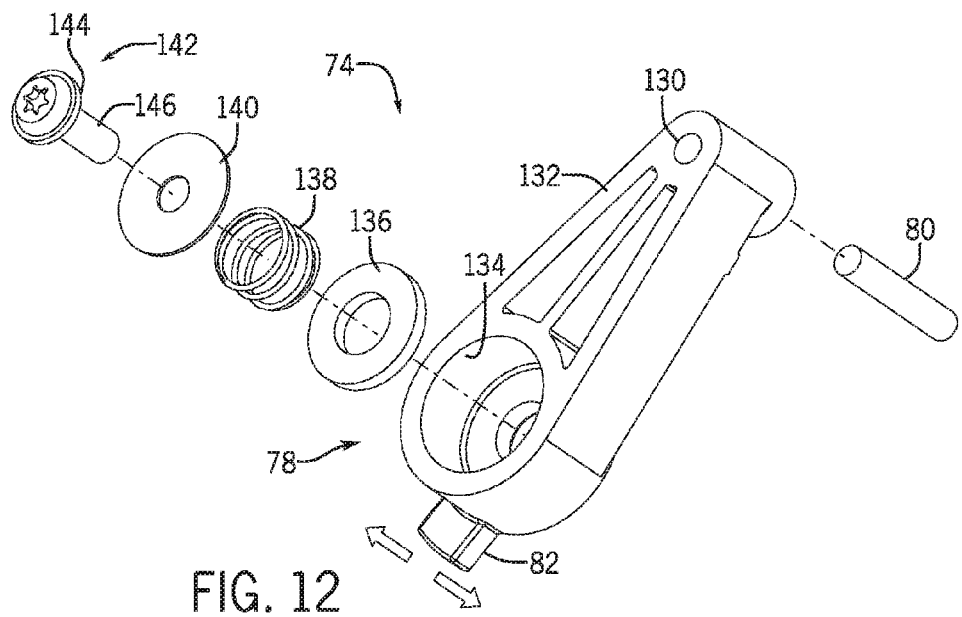
FIG. 12 is a schematic exploded view of an embodiment of a follower that may be employed within the adjustment mechanism according to an exemplary embodiment.

FIG. 12 is an exploded view of an embodiment of a follower 74 that may be employed within the adjustment mechanism 38. The follower 74 includes a first opening 130 within a body 132 of the follower 74. The first opening 130 is configured to secure the pin 80 to the body 132 (e.g., via a press-fit connection, an adhesive connection, etc.). The follower 74 also includes a second opening 134 within the body 132. The second opening 134 is configured to house the biasing assembly 78. The biasing assembly 78 includes a first washer 136 (e.g., formed from a resilient material, such as plastic), a compression spring 138, a second washer (e.g., formed from a rigid material, such as steel), and a fastener 142. The fastener 142 includes a head 144 and a shaft 146. The shaft 146 may be threaded to establish a threaded connection with the cylindrical mount 88 of the carrier 62.

The biasing assembly 78 is configured to urge the pin 80 against the track 76, enabling the pin 80 to follow the contours of the ramps and ridges. As the pin moves along a ramp, the pin 80 is driven to compress the spring 138. At the end of the ramp, the compressed spring 138 drives the pin 80 in the opposite direction to facilitate contact between the pin and a corresponding ridge and/or notch. The possibility of the pin disengaging the track is substantially reduced or eliminated.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An armrest assembly comprising:
   a pivot joint positioned at a first longitudinal end of the armrest assembly;
   wherein the pivot joint is configured to rotatably couple the armrest assembly to a housing of a vehicle interior component;
   an armrest configured to rotate about the pivot joint between a lowered position and a raised position; and
   an adjustment mechanism positioned at a second longitudinal end of the armrest assembly opposite the first longitudinal end;
   wherein the adjustment mechanism is configured to hold the armrest in one of a plurality of vertical positions including the lowered position and the raised position.

2. The armrest assembly of claim 1 wherein the adjustment mechanism comprises a carrier and a guide and the carrier is configured to translate along the guide to transition the armrest between the plurality of vertical positions.

3. The armrest assembly of claim 2 wherein the adjustment mechanism comprises: (a) a biasing member extending between the carrier and the guide; wherein the biasing member is configured to urge the armrest toward the lowered position; and (b) a damping member extending between the carrier and the guide; wherein the damping member is configured to damp movement of the armrest relative to the housing.

4. The armrest assembly of claim 2 wherein the adjustment mechanism comprises a follower rotatably coupled to the carrier; the follower includes a pin configured to engage a track within the guide; and the track includes a plurality of notches configured to capture the pin to block downward movement of the armrest relative to the housing.

5. The armrest assembly of claim 4 wherein the track comprises a plurality of ridges and each ridge is configured to direct the pin toward a correspond notch upon downward movement of the pin.

* * * * *